(12) United States Patent
Takeuchi

(10) Patent No.: US 6,778,482 B1
(45) Date of Patent: Aug. 17, 2004

(54) MOVING POSITION DETECTING APPARATUS OF A MOBILE ELEMENT AND A DISK APPARATUS USING THE SAME

(75) Inventor: Kazuhiro Takeuchi, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/674,545

(22) PCT Filed: Feb. 23, 2000

(86) PCT No.: PCT/JP00/01032

§ 371 (c)(1),
(2), (4) Date: Jan. 8, 2001

(87) PCT Pub. No.: WO00/52687

PCT Pub. Date: Sep. 8, 2000

(30) Foreign Application Priority Data

Mar. 2, 1999 (JP) .......................................... 11-054101

(51) Int. Cl.[7] ................................................ G11B 5/52
(52) U.S. Cl. ............................... 369/53.29; 369/53.39; 369/47.38
(58) Field of Search .......................... 369/30.35, 30.59, 369/40.01, 44.17, 44.19, 44.21, 47.38, 47.49, 52.1, 53.25, 53.28, 53.3, 53.38, 53.39, 53.4, 126, 133, 219, 238, 249, 53.29

(56) References Cited

U.S. PATENT DOCUMENTS

| 4,453,245 | A | | 6/1984 | Sugiyama et al. |
| 4,831,615 | A | | 5/1989 | Goto et al. |
| 4,964,111 | A | * | 10/1990 | Hangai et al. ............... 369/219 |
| 5,239,307 | A | * | 8/1993 | Andermo |
| 5,682,282 | A | * | 10/1997 | Kato |

FOREIGN PATENT DOCUMENTS

| JP | 61177687 | | 8/1986 |
| JP | 04137273 | | 5/1992 |
| JP | 404137273 | * | 5/1992 |
| JP | 6-20288 | | 1/1994 |
| JP | 2000205809 | * | 7/2000 |

* cited by examiner

Primary Examiner—Doris H. To
Assistant Examiner—Jorge Ortiz-Criado
(74) Attorney, Agent, or Firm—RatnerPrestia (57) ABSTRACT

A position detecting apparatus detect the moving position of a mobile element. The apparatus includes the mobile element moving reversibly along a specified running path, a conductive electrode disposed along the running path, a detecting electrode disposed on the mobile element, and a detector for detecting contact or non-contact between the conductive electrode and detecting electrode. The detecting electrode is disposed so as to contact or not to contact with the conductive electrode by the move of the mobile element. The position of the mobile element is detected by the detector.

12 Claims, 4 Drawing Sheets

MOVING POSITION DETECTING APPARATUS OF A MOBILE ELEMENT AND A DISK APPARATUS USING THE SAME

THIS APPLICATION IS A U.S. NATIONAL PHASE APPLICATION OF PCT INTERNATIONAL APPLICATION PCT/JP00/0132.

TECHNICAL FIELD

The present invention relates to an information recording and reproducing apparatus, and more particularly to a moving position detecting apparatus of a mobile element used in a disk apparatus of the like.

BACKGROUND ART

In a conventional disk apparatus of magnetic disk or optical disk, a pickup device is moved to an innermost circumferential position or outermost circumferential position of a disk. A position detecting apparatus detects when the pickup apparatus is moved to a specified position. Thus, the specified operation of the pickup apparatus is done automatically.

As the position detecting means, hitherto, a push type switch has been used. In this case, when the pickup apparatus is moved to an innermost circumferential position or outermost circumferential position of a disk, the pickup apparatus pushes this push type switch from its moving direction, thereby detecting that the pickup apparatus has reached the innermost circumferential position or outermost circumferential position.

In the push type switch, when a pressing work force larger than specified is applied to the pressing knob portion, the pressing knob portion is moved by overcoming the elastic force (reaction force) of the spring in the switch. When the pressing knob portion moves more than a specific distance, an electric contact is opened or closed. When the pressing force of the pressing knob portion is eliminated, it is restored to the initial state by the thrusting force of the spring. Therefore, when the pressing work force and the reaction force are not mutually balanced, that is, when the reaction force by the push type switch and the pressing work force by the pickup apparatus are not adjusted properly, if the pickup apparatus is sent to the innermost circumferential position or outermost circumferential position of the disk along the radial direction of the disk, the push type switch cannot be driven. Moreover, if the pickup apparatus is driven, the pickup apparatus may be shifted from the specified position by the reaction force of the switch after driving.

SUMMARY OF THE INVENTION

A position detecting apparatus of the invention for detecting the moving position of a mobile element comprises:

A mobile element moving reversibly along a specified running path,
a conductive electrode disposed along the running path,
a detecting electrode disposed on the mobile element, and
detecting means for detecting contact or non-contact between the conductive electrode and detecting electrode.

In which, the detecting electrode is disposed so as to contact with or not to contact with the conductive electrode by the move of the mobile element. The position of the mobile element is detected by the detecting means.

Preferably, the position detecting apparatus further includes a guide shaft for guiding the move of the mobile element, and the conductive electrode is disposed on the surface of the guide shaft.

Preferably, the position detecting apparatus further includes a guide shaft for guiding the move of the mobile element, and the conductive electrode is disposed on the surface of the guide shaft, and the detecting electrode is disposed so as to may contact electrically with the conductive electrode from the direction crossing with the moving direction of the detecting electrode.

Preferably, the position detecting apparatus further includes a guide shaft for guiding the move of the mobile element, and a drive shaft for moving the mobile element, and the conductive electrode is disposed on the surface of the drive shaft.

Preferably, the position detecting apparatus further includes a guide shaft for guiding the move of the mobile element, a drive shaft for moving the mobile element, and an elastic member disposed between the drive shaft and the mobile element, and the conductive electrode is disposed on the surface of the drive shaft.

In this constitution, application of reaction to the mobile element is prevented. Moreover, move of the mobile element from the specified position is lessened and eliminated.

BRIEF DESCRIPTION OF THE DRAWINGS

FIG. 3($a$) and FIG. 3($b$) are side views schematically showing the operating state of the moving position detecting apparatus of mobile element in the embodiment of the invention.

FIG. 6($a$) and FIG. 6($b$) are side views schematically showing the operating state of the moving position detecting apparatus of mobile element shown in FIG. 4.

BEST MODE FOR CARRYING OUT THE INVENTION

A moving position detecting apparatus of a mobile element in an embodiment of the invention comprises:

a mobile element moving reversibly along a specified running path,
an electrode holder having a conductive electrode partially at a specified position of the surface, and disposed along the running path,
a detecting electrode disposed on the mobile element so as to be connected electrically to the conductive electrode when the mobile element is positioned at a predetermined moving position on the running path, by contacting from a direction crossing with the moving direction of the mobile element, and
detecting means for detecting presence or absence of electric contact between the conductive electrode and detecting electrode.

In this constitution, the detecting electrode disposed on the mobile element contacts with the conductive electrode from the direction crossing with the moving direction of the mobile element. It hence prevents application of reaction to the mobile element. Moreover, move of the mobile element from the specified position is lessened and eliminated.

Preferably, the electrode holder includes a mobile element guide shaft disposed along the running path so that the mobile element slides and moves, and the conductive electrode is formed on the surface of the mobile element guide shaft.

In this constitution, the mobile element guide shaft necessary for the move of the mobile element and the electrode holder are commonly used, so that the structure is simplified.

Preferably, a plurality of the detecting electrodes are disposed on the mobile element, and the detecting means is contacting with the conductive electrode together with each detecting element.

In this constitution, since there are a plurality of detecting means, more secure detection is realized.

Preferably, the mobile element guide shaft is disposed, penetrating through the through-hole formed in the mobile element, and the plurality of detecting electrodes are disposed on the mobile element so as to contact with the surface of the mobile element guide shaft in the through-hole individually.

In this constitution, the detecting electrodes can be disposed in the mobile element forming the through-hole directly by driving or other means, and the structure is simplified.

A moving position detecting apparatus of a mobile element in other embodiment of the invention comprises:

a mobile element moving reversibly along a specified running path, an electrode holder having a conductive electrode partially at a specified position of the surface, and disposed parallel along the running path, a detecting electrode disposed on the mobile element so as to be connected electrically to the conductive electrode when the mobile element is positioned at a predetermined moving position, by contacting from a direction crossing with the moving direction of the mobile element, and detecting means for detecting presence or absence of electric contact between the conductive electrode and detecting electrode.

In this constitution, the detecting electrode disposed on the mobile element contacts with the conductive electrode from the direction crossing with the moving direction of the mobile element. It hence prevents application of-reaction to the mobile element. Moreover, move of the mobile element from the specified position is lessened and eliminated.

Preferably, the electrode holder is a drive shaft disposed parallel to the running path for transmitting rotary motion from the motor, and, the conductive electrode is formed on the surface of this drive shaft.

In this constitution, the drive shaft necessary for the move of the mobile element and the electrode holder are commonly used, so that the structure is simplified.

Preferably, a plurality of the detecting electrodes are disposed on a motion converting device disposed between the drive shaft and the mobile element, for converting the rotary motion from the drive shaft into a motion for reversibly moving the mobile element along the running path, and the detecting means detects when the detecting electrode contacts with the conductive electrode.

In this constitution, the motion converting device necessary for the move of the mobile element and the detecting electrode are commonly used, so that the structure is simplified.

Preferably, the motion converting device is formed so as to hold the drive shaft and mobile element with a spring pressure, and the plurality of detecting electrodes are disposed on the motion converting device so as to contact with the surface of the electrode holder.

In this constitution, since the detecting means are provided in a plurality, and the drive shaft and mobile element contact with each other as being pressed by the spring, secure detection of position of the mobile element is realized.

Moreover, in a constitution in which a lubricant is provided for moving the mobile element smoothly, disturbance of electric conduction by the lubricant is prevented, and the position of the mobile element can be detected accurately.

Exemplary embodiments of the moving position detecting apparatus of mobile element of the invention are specifically described below.

Exemplary Embodiment 1

As an exemplary embodiment of the moving position detecting apparatus of mobile element of the invention, a pickup device of a disk apparatus is described below.

Figure 1:
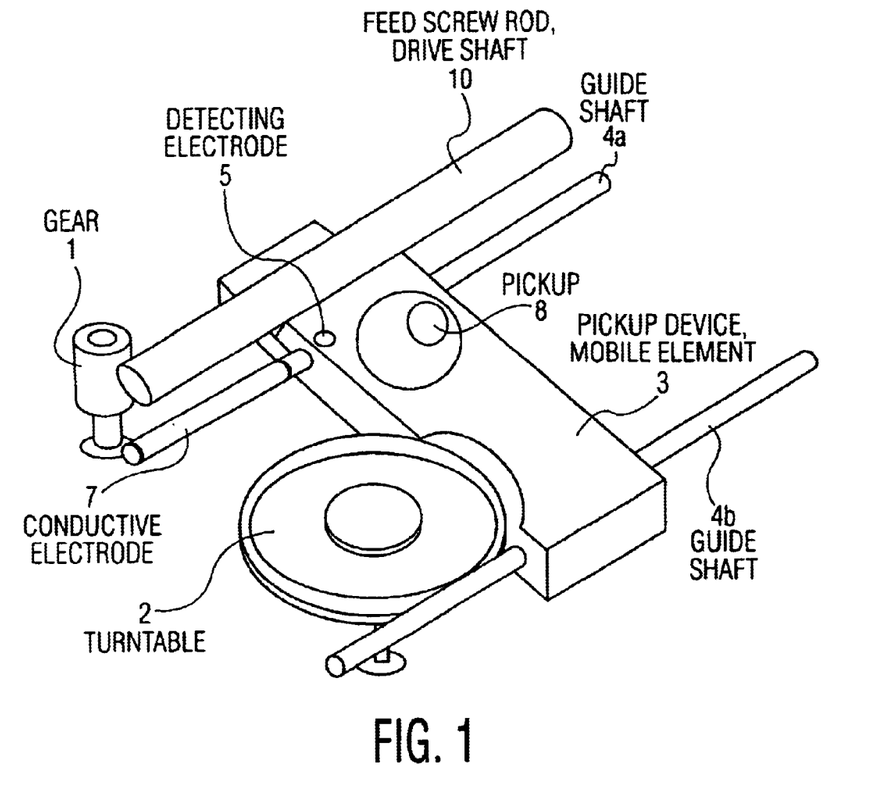
FIG. 1 is an essential perspective view of a moving position detecting apparatus of mobile element in an embodiment of the invention.
Figure 2:
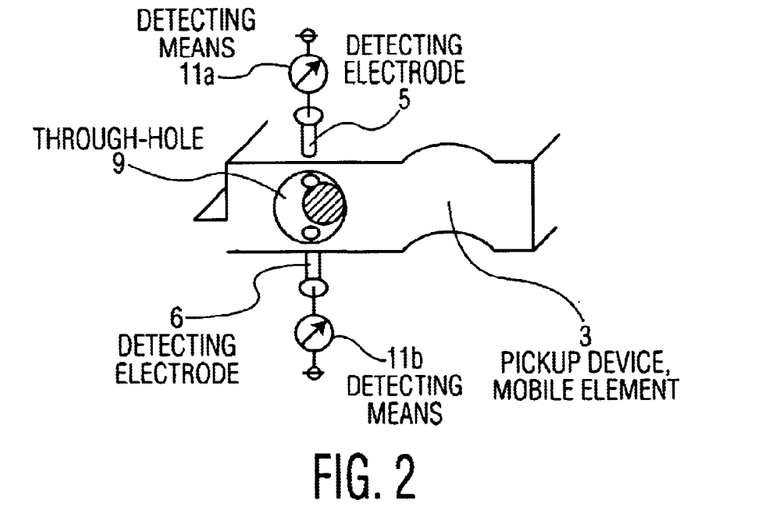
FIG. 2 is a partially cut-away perspective view of the moving position detecting apparatus of mobile element in the embodiment of the invention.

FIG. 1 is a perspective view of essential parts of a moving position detecting apparatus of mobile element in an exemplary embodiment of the invention. FIG. 2 is a partial magnified view of the moving position detecting apparatus shown in FIG. 1.

In FIG. 1 and FIG. 2, the moving position detecting apparatus comprises a pickup device 3 as mobile element, electrode holders 4a, 4b, 7 detecting electrodes 5, 6, detecting means 11a, 11b, and a drive shaft 10. The electrode holders 4a, 4b, 7 including mobile element guide shafts 4a, 4b, and a conductive electrode 7, and the mobile element guide shafts 4a, 4b have a first mobile element guide shaft 4a and a second mobile element guide element 4b. The conductive electrode 7 is disposed at a specified position of the surface of the mobile element guide shaft 4a. The detecting electrodes 5, 6 have a first detecting electrode 5 and a second detecting electrode 6. The detecting means 11a, 11b have first detecting means 11a and second detecting means 11b. The mobile element has a motion converting device (not shown) for converting the rotary motion of the drive shaft into a linear motion. The mobile element itself has a function of motion converting device. The mobile element moves along the guide shaft while being driven by the driving force of the drive shaft.

The pickup device 3 is made of a non-conductive material. The pickup device has a relatively light weight. The pickup device 3 has a pickup 8, and the disk (not shown) is mounted on a turntable 2. The disk has a function of information medium for recording and reproducing information. Two through-holes 9 are formed in the pickup device 3. Two guide shafts 4a, 4b are disposed parallel to each other by penetrating through the respective through-holes 9. These guide shafts 4a, 4b at least have a surface composed of a non-conductive material. The pickup device 3 can slide and move along these guide shafts 4a, 4b.

A feed screw rod 10 as drive shaft is disposed parallel to these guide shafts 4a, 4b, and the feed screw rod 10 is reversibly rotated by a gear 1 coupled to a motor (not shown). The pickup device 3 is always engaged with the feed screw rod 10. The pickup device 3 is reversibly slidable along the guide shafts 4a, 4b depending on the rotating direction of the feed screw rod 10.

On the surface at a specified position in the longitudinal direction of the first guide shaft 4a of the two guide shafts 4a, 4b, a conductive electrode 7 made of a conductive material is disposed. In this embodiment, the conductive electrode 7 is disposed on the surface at the end in the longitudinal direction of the first guide shaft 4a. This conductive electrode 7 is grounded. Near the end of the through-hole 9 penetrating through the first guide shaft 4a, the two detecting electrodes, that is, first detecting electrode 5 and second detecting electrode 6 are adjustably driven into the pickup device 3. Two detecting electrodes 5, 6 are disposed so that the leading ends of the two detecting electrodes 5, 6 may press the first guide shaft 4a to the inner wall of the through-hole 9 while abutting against the surface of the first guide shaft 4a, from mutually different directions. That is, the pickup device 3 moves while the leading ends of the first detecting electrode 5 and second detecting electrode 6 are contacting with the surface of the first guide shaft 4a from the direction crossing with the moving direction of the pickup device 3 in the through-hole 9. The direction crossing with the moving direction of the pickup device 3 is, for example, a right-angle direction. In such constitution, with the disk mounted on the turntable 2, the pickup device 3 moves to the innermost circumference and outermost circumference of the disk. When the pickup device 3 has reaches a specified position, it is detected by the position detecting apparatus. That is, the relative positions of the pickup 8 and disk are detected.

Figure 3A:
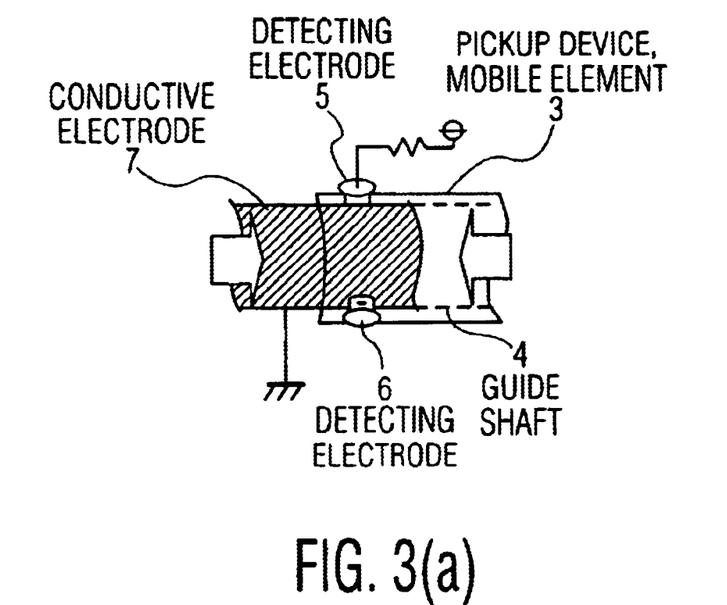

In this constitution, when the pickup device 3 moves and the first detecting electrode 5 and second detecting electrode 6 are moved to the position contacting with the conductive electrode 7 as shown in FIG. 3(a), an electric conductivity takes place between the first detecting electrode 5 and conductive electrode 7, and between the second detecting electrode 6 and conductive electrode 7. This electric conduction is detected by the first detecting means 11a and second detecting means 11b to detect conduction between the first detecting electrode 5 and conductive electrode 7, or between the second detecting electrode 6 and conductive electrode 7, or both. By this detection, it is confirmed that the pickup device 3 has moved to a specified position. As the first detecting means 11a and second detecting means 11b, ammeters or the like may be used.

Figure 3B:
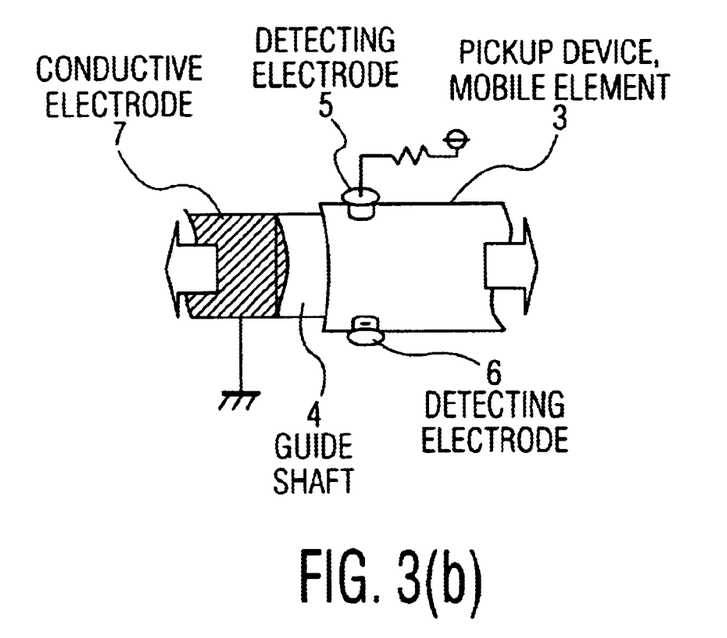

Similarly, as shown in FIG. 3(b), at the positions where these detecting electrodes 5, 6 are remote from the conductive electrode 7, electric conduction is not obtained between the detecting electrodes 5, 6 and conductive electrode 7. Accordingly, by detecting it may ammeters or other detecting means 11a, 11b, it is confirmed that the pickup device 3 is not moved to the specified position.

The embodiment is constituted so as to obtain an electric conduction between the detecting electrodes 5, 6 and conductive electrode 7 when the pickup device has moved to the specified position, but not limited to this constitution, to the contrary, it may be also effective to constitute so as to set in non-conducting state when reaching a specified position.

In the embodiment, the conductive electrode 7 is disposed on the guide shaft 4a as electrode holder, and the conductive electrode 7 and electrode holder 4a are shared, but not limited to this constitution, the electrode holder 4a and the conductive electrode 7 may be independently disposed mutually.

Also in the embodiment, the conductive electrode 7 is disposed on the first guide shaft 4a, but not limited to this constitution, the conductive electrode 7 may be also disposed on the second guide shaft 4b.

Exemplary Embodiment 2

A moving position detecting apparatus of mobile element in other exemplary embodiment of the invention is described below while referring to the accompanying drawings. Same constituent elements as in the preceding embodiment are identified with same reference numerals, and the description of the same constituent elements is omitted.

Figure 4:
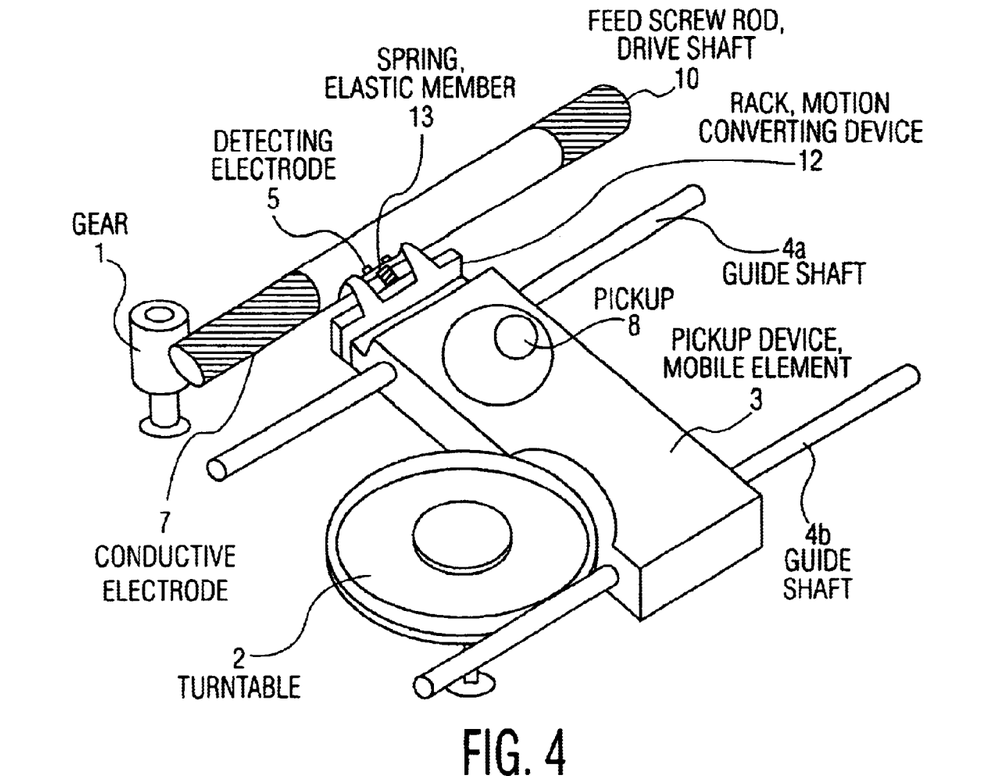
FIG. 4 is an essential perspective view of a moving position detecting apparatus of mobile element in other embodiment of the invention.
Figure 5:
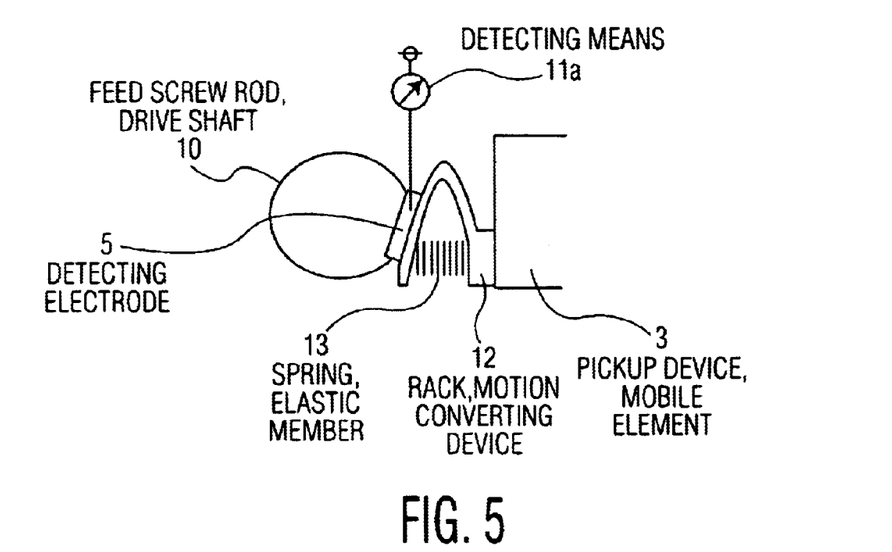
FIG. 5 is a partially cut-away sectional view of the moving position detecting apparatus of mobile element shown in FIG. 4.
Figure 6A:
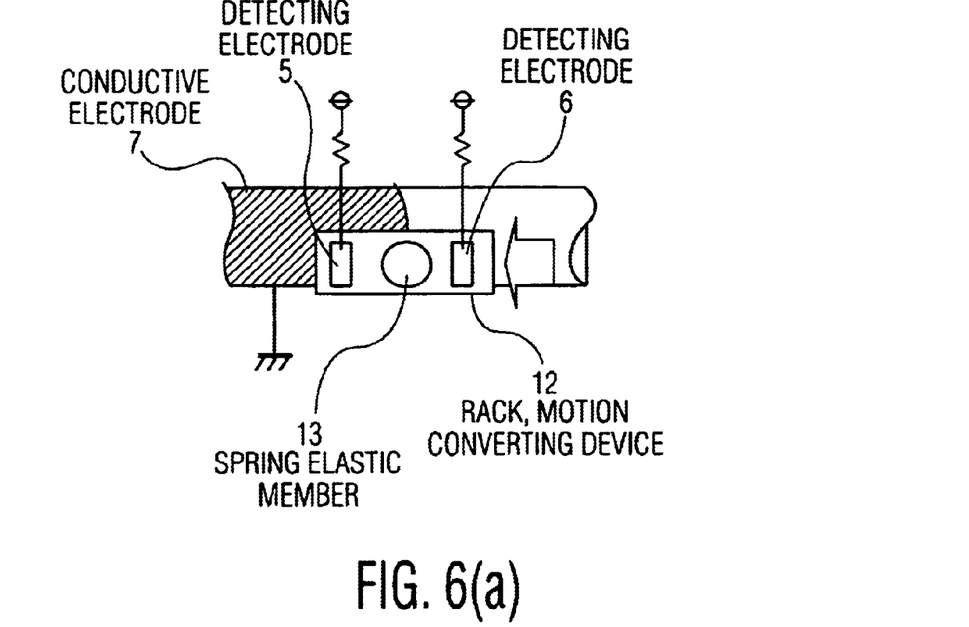
Figure 6B:
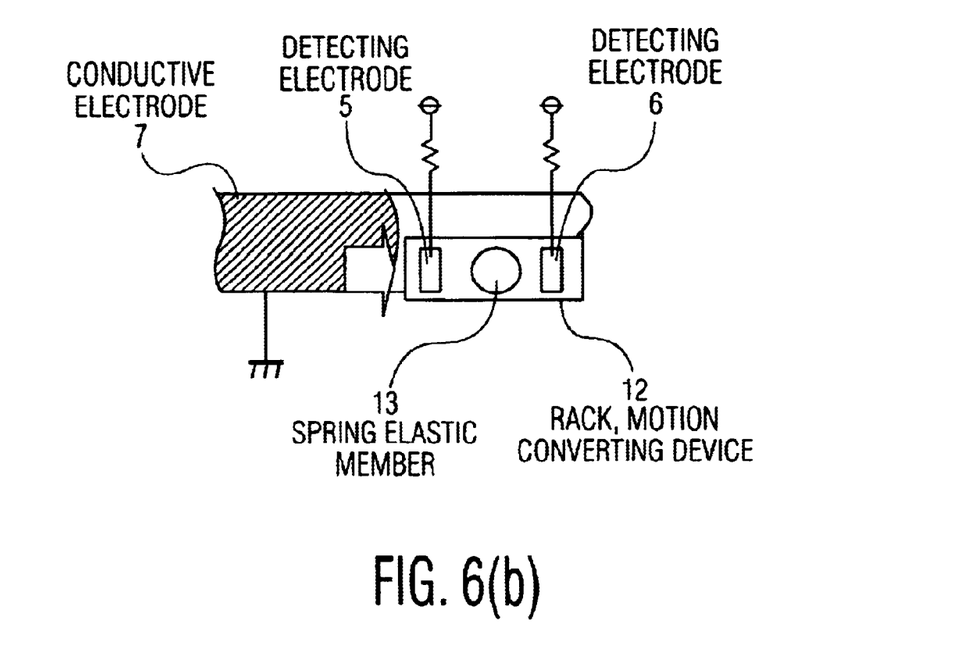

FIG. 4 is an essential perspective view of the moving position detecting apparatus of mobile element in exemplary embodiment 2 of the invention. FIG. 5, FIG. 6(a), and FIG. 6(b) are partial magnified views of the moving position detecting apparatus shown in FIG. 4.

In FIG. 4 and FIG. 5, the moving position detecting apparatus comprises a pickup device 3 as mobile element, mobile element guide shafts 4a, 4b, a drive shaft 10, a conductive electrode 7, detecting electrodes 5, 6, and detecting means 11a. The conductive electrode 7 is disposed at a specified position on the surface of the feed screw rod 10 as drive shaft. A rack 12 and a spring 13 are disposed between the pickup device 3 and feed screw rod 10. The rack 12 has a function as motion converting device. The rack 12 is always pressed and engaged with the pickup device 3 and feed screw rod 10 by the spring 13 as an elastic member. The rack 12 has a function of converting the rotary motion of the feed screw rod 10 into a sliding motion of the pickup device 3.

On the surface at a specified position of the feed screw rod 10, a conductive electrode 7 of a conductive material is formed, and this conductive electrode is grounded. The conductive electrode is disposed, for example, on the surface at the end of the feed screw rod 10. As shown in FIG. 5, the detecting electrodes 5, 6 are disposed in part of the rack 12. The feed screw rod 10 and detecting electrode 5 are pressed by the spring 13, and the detecting electrodes 5, 6 contact with the surface of the feed screw rod 10. The detecting electrode is composed of a plurality of electrodes of first detecting electrode 5 and second detecting electrode 6.

The first guide shaft 4a and second guide shaft 4b are disposed parallel to each other. The pickup device 3 is held by the first guide shaft 4a and second guide shaft 4b, and is reversibly movable along the first guide shaft 4a and second guide shaft 4b. A lubricant is applied on the surface of the guide shafts 4a, 4b, and this lubricant has a function of smoothing the move of the mobile element.

From the direction crossing with the moving direction of the pickup device 3, the pickup device 3 moves with the detecting electrode 5 kept in contact with the surface of the feed screw rod 10. The direction crossing with the moving direction of the pickup device 3 is, for example, a right-angle direction.

In this constitution, as the pickup device 3 moves, and, as shown in FIG. 6(b), when the detecting electrode 5 is moved to the position contacting with the conductive electrode 7, an electric conduction between the detecting electrode 5 and conductive electrode 7 is obtained. This electric conduction is detected by the detecting means 11a, and it is confirmed that the pickup device 3 has moved to the specified position.

Similarly, as shown in FIG. 6(b), in the state of the detecting electrode 5 departing from the conductive electrode 7, electric conduction is not obtained between the detecting electrode 5 and conductive electrode 7. Accordingly, by detecting it by the detecting means 11a, it is confirmed that the pickup device 3 is not moved to the specified position.

This embodiment is constituted so that the electric conduction between the detecting electrode 5 and conductive electrode 7 is obtained when the pickup device is moved to the specified position, but not limited to this constitution, to the contrary, it may be constituted so that the detecting electrode 5 and conductive electrode 7 do not conduct when the pickup device has reached the specified position.

In the embodiment, it is constituted to obtain electric conduction between one detecting electrode 5 and conductive electrode 7, but not limited to this constitution, it may be also effective to constitute so as to obtain electric conduction between a plurality of detecting electrodes and conductive electrode 7.

Industrial Applicability

In the constitution of the moving position detecting apparatus of mobile element of the invention, the detecting electrode disposed on the mobile element contacts with the conductive electrode from the direction of crossing with the moving direction of the mobile element. In this constitution, application of reaction to the mobile element is prevented, and the move of the mobile element from the specified position is lessened and eliminated.

Since the mobile element guide shaft and electrode holder are shared, the structure of the moving position detecting apparatus is simplified.

As the feed screw shaft and mobile element are pressed to contact by the spring pressure, the position of the mobile element is detected accurately.

In the constitution of the lubricant disposed on the surface of the guide shaft, disturbance of electric conduction by the lubricant is prevented, and the position of the mobile element can be detected accurately.

What is claimed is:

1. A position detecting apparatus for detecting a moving position of a mobile element, comprising:
    a mobile element moving reversibly along a specified running path
    a conductive electrode disposed along said running path,
    a detecting electrode disposed on said mobile element, said detecting electrode being disposed so as to contact and not to contact with said conductive electrode by a move of said mobile element, and
    detecting means for detecting contact and non-contact between said conductive electrode and said detecting electrode, the position of said mobile element being detected by said detecting means,
    an electrode holder disposed parallel to said running path,
    wherein said conductive electrode is disposed on a first surface of the surfaces of said electrode holder, and
    said detecting electrode may contact with said conductive electrode when said mobile element is moved to a predetermined moving position,
    wherein said detecting electrode may contact with said conductive electrode from a direction crossing with the moving direction of said mobile element,
    wherein said electrode holder has a drive shaft for transmitting rotary motion, and
    said conductive electrode is disposed on the surface of said drive shaft.

2. A position detecting apparatus for detecting a moving position of a mobile element, comprising:
    a mobile element moving reversibly along a specified running path,
    a conductive electrode disposed along said running path,
    a detecting electrode disposed on said mobile element, said detecting electrode being disposed so as to contact and not to contact with said conductive electrode by a move of said mobile element, and
    detecting means for detecting contact and non-contact between said conductive electrode and said detecting electrode, the position of said mobile element being detected by said detecting means,
    a drive shaft for moving said mobile element, and
    a motion converting device disposed between said drive shaft and said mobile element,
    wherein said conductive electrode is disposed on the surface of said drive shaft,
    said motion converting device has a function of converting a rotary motion from said drive shaft into a motion for moving reversibly said mobile element along said running path,
    said detecting electrode is disposed in said motion converting device, and
    said detecting electrode may contact with said conductive electrode when said mobile element is moved to a predetermined moving position.

3. The position detecting apparatus of claim 2,
    wherein said detecting electrode has a plurality of detecting electrodes, and
    said plurality of detecting electrodes may contact with said conductive electrode.

4. A position detecting apparatus for detecting a moving position of a mobile element, comprising:
    a mobile element moving reversibly along a specified running path,
    a conductive electrode disposed along said running path,
    a detecting electrode disposed on said mobile element, said detecting electrode being disposed so as to contact and not to contact with said conductive electrode by a move of said mobile element, and
    detecting means for detecting contact and non-contact between said conductive electrode and said detecting electrode, the position of said mobile element being detected by said detecting means,
    a drive transmission shaft for moving said mobile element, and
    an elastic member disposed between said mobile element and drive shaft,
    wherein said conductive electrode is disposed on the surface of said drive shaft,
    said detecting electrode is disposed between said elastic member and said drive shaft, and
    said detecting electrode may contact with the surface of said drive shaft and said conductive electrode while being pressed by the pressing force of said elastic member.

5. The position detecting apparatus of claim 4,
    wherein said detecting electrode has a plurality of detecting electrodes, and
    each one of said plurality of detecting electrodes may contact with the surface of said drive shaft and said conductive electrode while being pressed by the pressing force of said elastic member.

6. A position detecting apparatus for detecting a moving position of a mobile element, comprising:
    a mobile element moving reversibly along a specified running path,
    a conductive electrode disposed along said running path,
    a detecting electrode disposed on said mobile element, said detecting electrode being disposed so as to contact and not to contact with said conductive electrode by a move of said mobile element, and detecting means for detecting contact and non-contact between said conductive electrode and said detecting electrode, the position of said mobile element being detected by said detecting means, a guide shaft for guiding the move of said mobile element, a drive shaft for moving said mobile element, and a lubricant disposed on the surface of said guide shaft, wherein said conductive electrode is disposed on the surface of said drive shaft.

7. A disk apparatus for recording and reproducing information comprising:

a turntable for mounting a disk for recording information thereon, and a position detecting apparatus for detecting a relative positions of a mobile element and said disk mounted on said turntable, wherein said position detecting apparatus comprises:

said mobile element moving reversibly along a predetermined running path, a conductive electrode disposed along said running path, a detecting electrode disposed on said mobile element, said detecting electrode being disposed so as to contact and not to contact with said conductive electrode by the move of said mobile element, and detecting means for detecting contact and non-contact between said conductive electrode and said detecting electrode, a position of said mobile element being detected by said detecting means, wherein said position detecting apparatus further comprises:

a guide shaft for guiding the move of said mobile element, and a drive shaft for moving said mobile element, wherein said conductive electrode is disposed on the surface of said drive shaft.

8. A disk apparatus for recording and reproducing information comprising:

a turntable for mounting a disk for recording information thereon, and a position detecting apparatus for detecting a relative positions of a mobile element and said disk mounted on said turntable, wherein said position detecting apparatus comprises:

said mobile element moving reversibly along a predetermined running path, a conductive electrode disposed along said running path, a detecting electrode disposed on said mobile element, said detecting electrode being disposed so as to contact and not to contact with said conductive electrode by the move of said mobile element, and detecting means for detecting contact and non-contact between said conductive electrode and said detecting electrode, a position of said mobile element being detected by said detecting means, wherein said position detecting apparatus further comprises:

a guide shaft for moving said mobile element, wherein said conductive electrode is disposed on the surface of said drive shaft, said detecting electrode is disposed between said mobile element and said drive shaft, and said detecting electrode may contact with the surface of said drive shaft and said conductive electrode.

9. A disk apparatus for recording and reproducing information comprising:

a turntable for mounting a disk for recording information thereon, and a position detecting apparatus for detecting a relative positions of a mobile element and said disk mounted on said turntable, wherein said position detecting apparatus comprises:

said mobile element moving reversibly along a predetermined running path, a conductive electrode disposed along said running path, a detecting electrode disposed on said mobile element, said detecting electrode being disposed so as to contact and not to contact with said conductive electrode by the move of said mobile element, and detecting means for detecting contact and non-contact between said conductive electrode and said detecting electrode, a position of said mobile element being detected by said detecting means, wherein said position detecting apparatus further comprises:

a drive shaft for moving said mobile element, and an elastic member disposed between said mobile element and drive shaft, wherein said conductive electrode is disposed on the surface of said drive shaft, said detecting electrode is disposed between said elastic member and said drive shaft, and said detecting electrode may contact with the surface of said drive shaft and said conductive electrode while being pressed by the pressing force of said elastic member.

10. A moving position detecting apparatus of mobile element, comprising:

a mobile element moving reversibly along a predetermined running path, an electrode holder disposed along said running path, a conductive electrode disposed partially at a specified position of the surface of said electrode holder, a detecting electrode disposed on said mobile element, said detecting electrode may contact with said conductive electrode from a direction crossing with the moving direction of said mobile element, and detecting means for detecting presence and absence of electric connection between said conductive electrode and said detecting electrode when said mobile element is positioned at a predetermined moving position on said running path, wherein said electrode holder is disposed parallel along said running path, said electrode holder further has a drive shaft for transmitting rotary motion from the motor, and said conductive electrode is disposed on the surface of said drive shaft.

11. The moving position detecting apparatus of mobile element of claim 10, wherein said mobile element includes a motion converting device for converting the rotary motion from said drive shaft into a motion for moving said mobile element reversibly along said running path, said detecting electrode has a plurality of detecting electrodes, said plurality of detecting electrodes are disposed between said drive shaft and said mobile element, said plurality of detecting electrodes are disposed in said motion converting device, and said detecting means detects when said detecting electrode contacts with said conductive electrode.

12. The moving position detecting apparatus of mobile element of claim 11, further comprising:

a spring disposed between said drive shaft and mobile element, wherein said motion converting device is pressed to said drive shaft and mobile element by a spring force, and said plurality of detecting electrodes are disposed in said motion converting device so as to contact with the surface of said electrode holder.

* * * * *